Dec. 29, 1964     A. M. VASH ETAL     3,163,805
ELECTRICAL CURRENT-BALANCE APPARATUS
Filed Aug. 27, 1962

INVENTORS.
ARTHUR M. VASH
ELBERT P. LITTLE
BY WESLEY G. PERRY

Dike, Thompson, Bronstein & Mrose
ATTORNEYS 3,163,805
ELECTRICAL CURRENT-BALANCE APPARATUS
Arthur M. Vash, Newton Center, Elbert P. Little, West Newton, and Wesley G. Perry, Wayland, Mass., assignors to Macalaster Scientific Corporation, Cambridge, Mass., a corporation of Massachusetts
Filed Aug. 27, 1962, Ser. No. 219,640
7 Claims. (Cl. 317—197)

The present invention relates to improvement in electrical current-balance apparatus and, in one particular aspect, to novel and improved equal-arm balance provisions of low-cost construction which are readily adjustable and afford highly precise measurements in association with air-core solenoid units.

It is of course well known that the interactions between the magnetic field in an air-core solenoid and the transverse field developed by a current-carrying conductor will occasion mechanical forces which are usefully adapted to precison measurements, such as measurements of mass, length, current or magnetic field strength. To this end, various forms of current-balance devices have been developed for accurate laboratory investigations, and a knife-edge type of suspension has commonly been exploited in achieving the necessary very low levels of pivoting friction. A preferred device of this form also requires that the electrical current applied through an armature-mounted conductor be coupled by way of the knife-edge suspension elements, such that measurements can be seriously disturbed by even slight variations in contacting conditions. Equal-arm balance devices are preferably constructed using a plastic blade-like armature, which offers a desired rigidity with low mass, and onto which the needed conductor may be applied using printed circuit techniques; however, it is found that these blade-like elements tend to become unbalanced even with changing ambient moisture conditions and to demand regular and careful adjustment before each use. In accordance with the present teachings, the troublesome unbalancing tendencies in an equal-arm current balance device are satisfactorily overcome in a printed-circuit armature which is of substantially identical physical characteristics on both sides of a pivot axis, with one side of the printed circuitry being preserved wholly passive electrically, and which is initially provided with integral balancing tabs permitting exact and permanent balancing adjustments which are not subject to accidental disturbance. In addition, repeatable precise balancing, as well as positive electrical contacting, are developed by cylindrical blade pivots in tangential rolling contact with cylindrical supports, both readily and inexpensively fashioned from wire stock.

It is one of the objects of the present invention, therefore, to provide novel and improved current-balance apparatus of simplified low-cost construction wherein an equal-arm balance element is of a permanently-balanced symmetrical printed-circuit form which resists environment-induced unbalancing.

Another object is to provide in a current-balance device a clip-on type armature suspension which is readily adjustable without exercise of special skill to assure low-friction pivoting and sound electrical contacting.

By way of a summary account of practice of this invention in one of its aspects, a cylindrical air-core solenoid of a conventional type supported by rectangular end brackets is mated with a narrow substantially rectangular blade-like armature member over substantially one half its length. The armature member comprises a flat blade-like strip of phenolic resin onto one side of which a peripheral stripe of copper has been silk-screened, the copper in turn being lightly plated with tin to suppress corrosion. Substantially mid-way along the length of the armature, the peripheral conductive stripe is interrupted, to isolate the halves electrically, and the U-shaped stripe applied to one half of the armature blade has each of its open ends rigidly soldered to a different short length of stiff copper wire the unsoldered part of which projects outwardly and collinearly to form a pivot lying along a pivot axis transversely of the blade and laterally displaced from its center of mass by but a small distance. At each of its narrower ends, the flat plastic blade exhibits an integral narrow rectangular tab, projecting outwardly beyond the striping at that end where it may be filed or sanded away in part, without damaging the striping, to achieve a mass-balance of the armature about the transverse pivot axis. The two outwardly-extending armature pivots each rest upon the horizontal cylindrical leg of a different L-shaped support, each formed from a short length of stiff copper wire and having its vertical leg soldered rigidly to one blade of an alligator-type clip grasping one of the end brackets of the solenoid.

Although the features of this invention which are believed to be novel are set forth in the appended claims, greater detail as to the invention in its preferred embodiments and the further objects and advantages thereof may be readily comprehended through reference to the following description taken in connection with the accompanying drawings, wherein:

FIGURE 1 presents a pictorial view of a current-balance assembly in which teachings of this invention are practiced;

Figure 1:
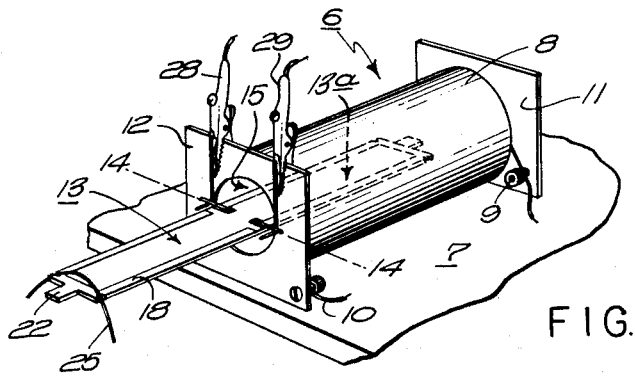
Figure 2:
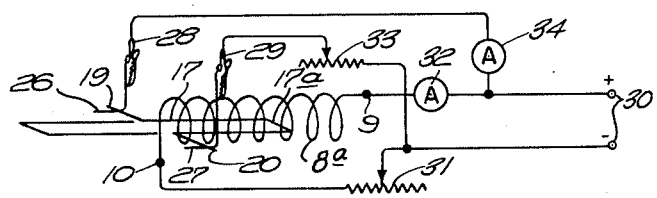
FIGURE 2 is a schematic diagram of a current-balance network involving the assembly of FIGURE 1.
Figure 3:
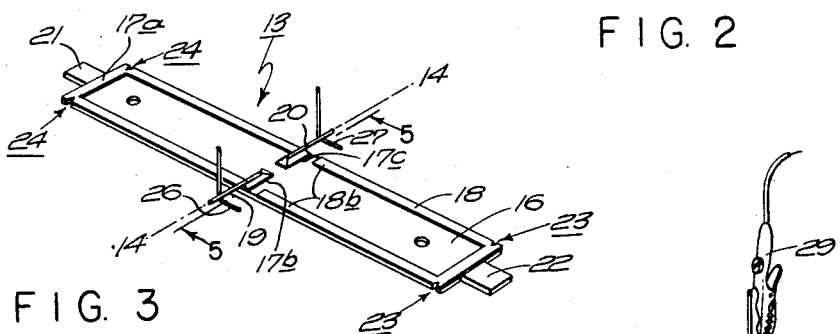
FIGURE 3 depicts an improved current-balance armature and part of its associated suspension.
Figure 4:
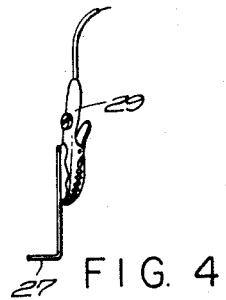
Figure 5:
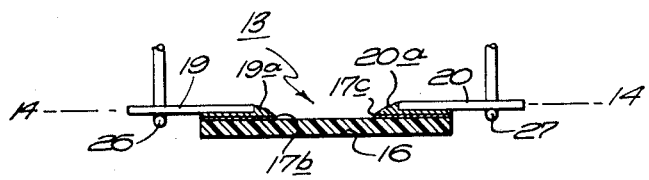

FIGURE 4 pictures a clip-on type suspension unit used in the current-balance equipment of FIGURES 1, 2 and 3; and FIGURE 5 provides an enlarged transverse cross-section of the armature of FIGURE 3, taken along the section line 5—5.

The equipment 6 portrayed in FIGURE 1 is arranged for laboratory measurements, atop and near the edge of a bench or like support 7. Air-core solenoid unit 8, which is of a standard configuration designed for use in a variety of laboratory investigations, includes a helical electrical winding 8a (FIGURE 2) along the cylindrical body portion of the solenoid, connected with electrical terminals 9 and 10, as well as a pair of integral rectangular end brackets, 11 and 12, which aid in the support of the unit, as shown. In operative association with the solenoid unit, a balance armature assembly 13 is delicately suspended for angular movements about a transverse axis 14—14 disposed just slightly forward of the front end bracket 12, with its rear half 13a, projecting freely into the central cylindrical recess 15 of the solenoid unit. Armature 13 is of the equal-arm type, in which the halves on each side of the suspension axis 14—14 are intended to be of about the same length and to be precisely counterbalanced. For precision measurement purposes, the pivotal suspension must exhibit very low and unvarying frictional characteristics, the armature must be of only very small mass and bulk, the center of mass should lie close to the pivot axis, and the mass balancing about the pivot axis should remain undisturbed by changing ambient environmental conditions. These considerations have led to the use of a thin plastic blade as the basic structural element for the armature, with the necessary current conductor on the rear half 13a being of low mass and deposited directly onto the plastic blade through exploitation of printed-circuit techniques. However, this construction is not alone sufficient to overcome mass imbalance problems, particularly those which result from non-uniform absorptions of moisture from the ambient atmosphere, and it is found that significant improvement is realized when the armature is formed as a substantially symmetrical assembly. The latter assembly is of the same configuration on both halves (shown as rectangular in the illustrations) and carries substantially the same printed circuit conductive stripes on both halves of the plastic blade 16. The conductive striping 17 (FIGURE 3) on the rear half of the armature is generally U-shaped, with its closed end 17a parallel to the pivot axis 14—14 and the connecting sides in perpendicular relationship; conductive striping 18 is of essentially the same configuration, except that its open end 18b terminate short of and do not make electrical connection with striping 17 or with the pivots 19 and 20 soldered to the accommodating transverse tab-like extensions of the open ends 17b and 17c of the striping 17. In operation of the current-balance equipment, the open-circuited peripheral striping 18 remains essentially passive, while current is forced through peripheral striping 17 by way of the conductive pivots 19 and 20. Phenolic resin blade 16 is preserved in physical symmetry, and the exposed surfaces on both sides of the pivot axis are of substantially the same area, such that moisture absorptions and attendant mass changes in both halves of the armature are substantially the same.

Initially, the plastic blade 16 is formed with narrow tabs 21 and 22 integral with and extending outwardly from its narrower ends. These tabs, which are not covered by the conductive striping, are provided for permanent balancing of the armature. After the conductive striping has been applied, and the stiff cylindrical copper wire pivots 19 and 20 have been soldered at 19a and 20a in alignment on the striping extensions 17b and 17c, and the matching end notches 23 and 24 have been cut near the narrower ends of the blade, the armature is then tested for balancing, on suitable low-friction supports for the pivots. Any unbalance which displays itself is counteracted by removing some of the material of the appropriate tab, 21 or 22, as by filing. When a balanced condition is attained, the armature thereafter remains stably balanced, there being no balancing adjustments which can be accidentally disturbed. The aforementioned notches 23 are cut as locating guides for a mass sample, such as the sample of fiber 25 (FIGURE 1) or the like, with the notches 24 being matched. Soldering of the pivots 19 and 20 close to the surface of the thin plastic blade 16 insures that the pivot axis 14—14 is close to the center of mass of the armature and that the pivoting sensitivity is high. Preferably, the copper conductive striping 17 and 18 is plated with tin, to suppress corrosion.

Low-friction suspension of the armature, which is essential to operating accuracy, is assured by support of the stiff cylindrical pivots 19 and 20 upon transversely-extending stiff cylindrical supports 26 and 27, respectively. The latter are conveniently and inexpensively fashioned of lengths of copper wire which are bent into L-shaped configurations and which are each securely soldered to one jaw of a different alligator-type clip terminal, 28 and 29, respectively. The latter clip terminals, or their equivalents, may be securely and easily affixed to the solenoid end bracket 12 in the manner shown in FIGURE 1, with the lower ends 26 and 27 of the supports projecting horizontally forward of the solenoid and transversely to the armature pivots. The rolling actions between these cylindrical pivots and cylindrical supports involve only the contacts between transverse lines, and are thus of exceedingly low, and unvarying, friction.

In one use of the equipment, represented by the schematic illustration of FIGURE 2, direct current from source terminals 30 is applied to solenoid coil 8a through a regulating variable resistance 31 and a current-measuring instrument 32. Current from the same, or another, source is also delivered to the conductive stripe 17 through a regulating variable resistance 33 and current-measuring instrument 34 and by way of the clips 28 and 29, the supports 26 and 27, and the pivots 19 and 20. Only the magnetic field developed by current in end 17a of striping 17 is effective to develop a torque in reaction with the axially-extending field of solenoid coil 8a, and, with appropriate polarities of excitation, this torque effects a counterbalance of the opposite torque developed by a mass, such as mass 25 (FIGURE 1), at the opposite end of the armature. Open-circuited striping 18 is ineffective, electromagnetically. Currents and mass (of mass 25) being known, the magnetic field strength can readily be calculated, for example.

Practice of this invention is not limited to the particular mechanisms illustrated, it being understood that the foregoing description has been presented by way of explanation rather than limitation, and those skilled in the art will recognize that various modifications, substitutions and combinations may be made without departure either in spirit or scope from the invention in its broader aspects.

What we claim as new and desire to secure by Letters Patent of the United States is:

1. Current-balance apparatus for use with an air-core solenoid of the type having a helical winding on a cylindrical body, comprising an equal-arm balance armature including an elongated thin and flat plastic blade, said blade having cylindrical pivot means of conductive material extending laterally and collinearly outwardly from opposite side edges of said blade about a pivot axis transverse to the elongated blade and substantially midway therealong, said blade also having applied to a face thereof two substantially like shaped strips of conductive material one on either side of said pivot axis, said cylindrical pivot means being attached to opposite ends of one of said conductive strips for current flow therebetween, said plastic blade and conductive strips on each side of said transverse pivot axis being substantially symmetrical with one another and of substantially the same configurations and surface areas, a pair of pivot supports each including a cylindrical conductive element, and means for mounting each of said supports on an end of the solenoid in spaced relation to the other with said element extending substantially parallel with the central axis of the solenoid, whereby said cylindrical armature pivot means may be rested transversely on said cylindrical elements of said pivot supports to make low-friction contact therewith through a range of relative angular movements.

2. Current-balance apparatus as set forth in claim 1, each said strip extending from a mid-portion of said blade toward an end of said blade and back toward the mid portion of said blade, and wherein said plastic blade further includes relatively narrow flat tabs of relatively small area integral therewith and extending outwardly from each of the ends of said blade beyond said strips and in the same plane as said blade, whereby substantially permanent balancing of said blade about said pivot axis may be achieved by trimming of at least one of said tabs.

3. Current-balance apparatus as set forth in claim 1 wherein said pivot supports each include an L-shaped member formed of stiff cylindrical conductive wire, and wherein said mounting means comprises a pair of clips of conductive material each shaped to grasp and hold itself upon an end of the solenoid, one of the legs of each of said L-shaped members comprising said element and the other being rigidly soldered to a different one of said clips to orient said one of said legs substantially parallel with the central axis of the solenoid when the clip is mounted on the solenoid end.

4. Current-balance apparatus as set forth in claim 3 wherein said end of solenoid has an end flange, said clips comprise alligator clips each having jaws for grasping the end flange about the top edge thereof, said L-shaped members each being soldered to one of the jaws of a different one of said alligator clips.

5. Current-balance apparatus as set forth in claim 1 wherein each of said strips is U-shaped, the free ends of one of said U-shaped strips of conductive material are each extended transversely along the blade parallel with said pivot means comprising pivot axis, said short lengths of conductive cylindrical wire soldered directly to different ones of said extended ends, and wherein the free ends of the other of said U-shaped strips are spaced a small distance from and electrically insulated by said plastic blade from said extended ends, whereby said other of said U-shaped strips is electrically isolated from said pivot means and is electromagnetically passive.

6. Current-balance apparatus as set forth in claim 5 wherein said U-shaped strips comprise uniform-width strips of copper silk-screened onto said blade and a continuous coating of tin atop said copper which inhibits corrosion.

7. Current-balance apparatus comprising an air-core solenoid having a helical winding on a hollow cylindrical body provided with transverse substantially rectangular end brackets, an equal-arm balance armature including an elongated thin and flat plastic blade the two halves of which are symmetrical and of substantially the same configuration and surface area on each side of a transverse axis midway of its length, each half of said plastic blade having a U-shaped strip of conductive material applied to one side thereof, pivot means in the form of two short stiff cylindrical lengths of conductive wire each rigidly soldered to a different free end of one of said U-shaped strips and each extending outwardly of said blade collinearly with the other about a pivot axis transverse to and parallel with the elongated blade and substantially midway therealong, and a pair of pivot supports each in the form of stiff cylindrical conductive wire, means mounting said supports at one end of said solenoid on one of said brackets in spaced relationship with a portion of each support extending substantially horizontally and substantially parallel with the central axis of said solenoid, said armature pivots being rested transversely on the horizontally-extending portions of said supports and the half of said armature carrying said one of said U-shaped strips being disposed within said hollow body of said solenoid.

References Cited by the Examiner
FOREIGN PATENTS
847,498  9/60  Great Britain.

JOHN F. BURNS, *Primary Examiner.*